United States Patent
Hosaka et al.

(10) Patent No.: US 7,704,910 B2
(45) Date of Patent: Apr. 27, 2010

(54) CATALYST FOR POLYMERIZATION OF OLEFINS AND METHOD FOR POLYMERIZATION OF OLEFINS

(75) Inventors: Motoki Hosaka, Chigasaki (JP); Takefumi Yano, Chigasaki (JP); Hiroyuki Kono, Chigasaki (JP)

(73) Assignee: Toho Titanium Co., Ltd., Chigasaki-shi (JP)

(*) Notice: Subject to any disclaimer, the term of this patent is extended or adjusted under 35 U.S.C. 154(b) by 565 days.

(21) Appl. No.: 11/569,229

(22) PCT Filed: May 17, 2005

(86) PCT No.: PCT/JP2005/009314

§ 371 (c)(1),
(2), (4) Date: Mar. 6, 2007

(87) PCT Pub. No.: WO2005/111090

PCT Pub. Date: Nov. 24, 2005

(65) Prior Publication Data

US 2007/0244277 A1 Oct. 18, 2007

(30) Foreign Application Priority Data

May 18, 2004 (JP) ............................... 2004-147377

(51) Int. Cl.
- C08F 4/64 (2006.01)
- C08F 4/642 (2006.01)
- C08F 4/647 (2006.01)
- C08F 4/649 (2006.01)
- B01J 31/14 (2006.01)

(52) U.S. Cl. ............ 502/115; 502/116; 502/118; 502/133; 526/125.1; 526/125.3; 526/351

(58) Field of Classification Search ................. 502/115, 502/116, 118, 133; 526/125.1, 125.3, 351
See application file for complete search history.

(56) References Cited

U.S. PATENT DOCUMENTS

| | | | |
|---|---|---|---|
| 6,730,753 B2* | 5/2004 | Fottinger et al. | 526/128 |
| 6,825,146 B2* | 11/2004 | Kilty et al. | 502/107 |
| 7,141,634 B2 | 11/2006 | Hosaka et al. | |

FOREIGN PATENT DOCUMENTS

| | | |
|---|---|---|
| JP | 57 63310 | 4/1982 |
| JP | 57 63311 | 4/1982 |
| JP | 58 113209 | 7/1983 |
| JP | 61 78803 | 4/1986 |
| JP | 63 3010 | 1/1988 |
| JP | 1 315406 | 12/1989 |
| JP | 2 84404 | 3/1990 |

(Continued)

*Primary Examiner*—Caixia Lu
(74) *Attorney, Agent, or Firm*—Oblon, Spivak, McClelland, Maier & Neustadt, L.L.P.

(57) ABSTRACT

A catalyst for olefin polymerization comprising (A) a solid catalyst component prepared by causing (a) a magnesium compound, (b) a tetravalent titanium halide compound, and (c) an electron donor compound to come in contact with each other, (B) an organoaluminum compound of the general formula $R^1_p AlQ_{3-p}$, and (C) an oligomer of an organosilicon compound of the following chemical formula; $R^4$—$(R^2R^3SiO)_m$—$R^5$ can produce olefin polymers having higher stereoregularity and a broader molecular weight distribution in a higher yield than conventional catalysts.

15 Claims, 1 Drawing Sheet

FOREIGN PATENT DOCUMENTS

| | | |
|---|---|---|
| JP | 3 7703 | 1/1991 |
| JP | 4 7305 | 1/1992 |
| JP | 4 331211 | 11/1992 |
| JP | 6 199946 | 7/1994 |

\* cited by examiner

CATALYST FOR POLYMERIZATION OF OLEFINS AND METHOD FOR POLYMERIZATION OF OLEFINS

This application is a 371 of PCT/JP05/09314 filed May 17, 2005.

TECHNICAL FIELD

The present invention relates to a catalyst for olefin polymerization which can produce olefin polymers with a broad molecular weight distribution in a high yield while maintaining high stereoregularity of the olefin polymers and to a process for polymerizing olefins in the presence of the catalyst.

BACKGROUND ART

Conventionally, a number of methods for polymerizing or copolymerizing olefins in the presence of a catalyst for olefin polymerization comprising a solid catalyst component containing magnesium, titanium, an electron donor compound, and halogen as essential components, an organoaluminum compound, and an organosilicon compound have been proposed.

For example, Patent Document 1 (JP-A-57-63310) and Patent Document 2 (JP-A-57-63311) propose a method for polymerizing olefins with three or more carbon atoms, in which a catalyst comprising a combination of a solid catalyst component containing a magnesium compound, titanium compound, and an electron donor, an organoaluminum compound, and an organosilicon compound having an Si—O—C bond is used. However, because these methods are not necessarily satisfactory for producing highly stereoregular polymers in a high yield, further improvement of the method has been desired.

Patent Document 3 (JP-A-63-3010) proposes a catalyst for olefin polymerization and a method for polymerizing olefins in the presence of the catalyst. The catalyst for olefin polymerization comprises a solid catalyst component, prepared by heat-processing of a powdered product obtained by causing dialkoxymagnesium, diester of an aromatic dicarboxylic acid, aromatic hydrocarbon, and titanium halide to come in contact with each other, an organoaluminum compound, and an organosilicon compound.

Patent Document 4 (JP-A-1-315406) proposes another catalyst for olefin polymerization and a method for polymerizing olefins in the presence of this catalyst. The catalyst for olefin polymerization comprises a solid catalyst component prepared by causing a suspension containing diethoxymagnesium and alkylbenzene to come in contact with titanium tetrachloride, reacting the suspension with phthalic acid dichloride, and causing the resulting solid product to come in contact with titanium tetrachloride in the presence of alkylbenzene, an organoaluminum compound, and an organosilicon compound.

Patent Document 5 (JP-A-2-84404) proposes a catalyst for olefin polymerization comprising a solid titanium catalyst component containing magnesium, titanium, and halogen as the essential components obtained by causing a magnesium compound and a titanium compound to come in contact with each other, an organoaluminum compound catalyst component, and an organosilicon compound catalyst component containing a cyclopentyl group, cyclopentenyl group, cyclopentadienyl group, or a derivative of these groups, as well as a method for polymerizing or copolymerizing olefins in the presence of this catalyst.

All of the above-described conventional technologies have attained excellent results in improving the catalyst activity to enable omission of an ash-removal step for removing catalyst residues such as chlorine and titanium from the formed polymers, improving the yield of stereoregular polymers, and improving the durability of the catalyst activity during the polymerization.

However, olefin polymers obtained by polymerizing olefins using a catalyst for olefin polymerization containing this type of highly active catalyst component, an organoaluminum compound, and an organosilicon compound have been found to possess a molecular weight distribution narrower than that of olefin polymers obtained by polymerizing olefins using a catalyst for olefin polymerization in which the conventional titanium trichloride catalyst component is combined with an organoaluminum compound and, optionally, an electron donor compound as the third component. The narrow molecular weight distribution leads to a low melting viscoelasticity of the polymer to be processed, which gives rise to impaired moldability or outward appearance of the final products (polyolefins). The application of the olefin polymers must be limited to a certain degree.

Various ideas have been put into practice in an attempt to solve this problem. One example is using multi-stage polymerization to obtain polyolefin with a broad molecular weight distribution. However, the multi-stage polymerization involves undesirable features including a high cost such as repetition of a complicated polymerization process and recovering of a chelating agent used in the polymerization.

Patent Document 6 (JP-A-3-7703) proposes a method for polymerizing olefins in the presence of a catalyst for olefin polymerization comprising a solid titanium catalyst component containing magnesium, titanium, halogen, and an electron donor as essential components, an organoaluminum compound, and at least two electron donors (organosilicon compounds).

The applicants claim that the target polyolefin with a broad molecular weight distribution can be obtained without requiring a complicated multi-stage polymerization. However, the requirement of using two or more organosilicon compounds as electron donors during polymerization makes the process complicated.

(Patent Document 1) JP-A-57-63310 (claims)
(Patent Document 2) JP-A-57-63311 (claims)
(Patent Document 3) JP-A-63-3010 (claims)
(Patent Document 4) JP-A-1-315406 (claims)
(Patent Document 5) JP-A-2-84404 (claims)
(Patent Document 6) JP-A-3-7703 (claims)

Accordingly, an object of the present invention is to solve the above problems remaining in the prior art and to provide a catalyst for olefin polymerization and a process for polymerizing olefins, which can produce olefin polymers having a broad molecular weight distribution by a simple procedure while maintaining the yield of polymers with high stereoregularity

DISCLOSURE OF THE INVENTION

In view of this situation, the present inventors have conducted extensive studies. As a result, the present inventors have found that an olefin polymer with a high stereoregularity and a broad molecular weight distribution can be obtained in a high yield by polymerizing olefins using a catalyst formed from a solid catalyst component made from a magnesium compound, tetravalent titanium halide, and an electron donor compound as raw materials, an organoaluminum compound, and an oligomer of an organosilicon compound. This finding has led to the completion of the present invention.

Specifically, the present invention provides a catalyst for olefin polymerization comprising:

(A) a solid catalyst component prepared by causing (a) a magnesium compound, (b) a tetravalent titanium halide compound, and (c) an electron donor compound to come in contact with each other (B) an organoaluminum compound of the following general formula (1), $$R^1_p AlQ_{3-p} \quad (1)$$

wherein $R^1$ represents an alkyl group having 1-4 carbon atoms, Q represents a hydrogen atom or a halogen atom, and p represents a real number satisfying the formula $0 < p \leq 3$, and (C) an oligomer of an organosilicon compound of the following chemical formula (1),

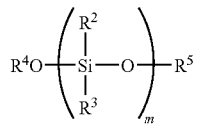

(1)

wherein $R^2$ and $R^3$ individually represent an alkyl group or alkoxy group having 1 to 6 carbon atoms or a halogen atom selected from chlorine atom, bromine atom, and fluorine atom, $R^4$ and $R^5$ individually represent an alkyl group having 1 to 6 carbon atoms, and m indicates the number of repetition of from 2 to 20.

The present invention also provides a catalyst for olefin polymerization comprising:

(A) the above solid catalyst component, (B) an organoaluminum compound shown by the above general formula (1), (C) an oligomer of an organosilicon compound shown by the above chemical formula (1), and (D) an organosilicon compound of the following general formula (2), $$R^6_q Si(OR^7)_{4-q} \quad (2)$$

wherein $R^6$ individually represents an alkyl group having 1 to 12 carbon atoms, cycloalkyl group, phenyl group, vinyl group, allyl group, or aralkyl group, $R^7$ individually represents an alkyl group having 1 to 4 carbon atoms, cycloalkyl group, phenyl group, vinyl group, allyl group, or aralkyl group, and q indicates an integer from 0 to 3.

The present invention further provides a process for polymerizing olefins characterized by polymerizing or copolymerizing olefins in the presence of the above catalyst for olefin polymerization.

BEST MODE FOR CARRYING OUT THE INVENTION

Figure 1:
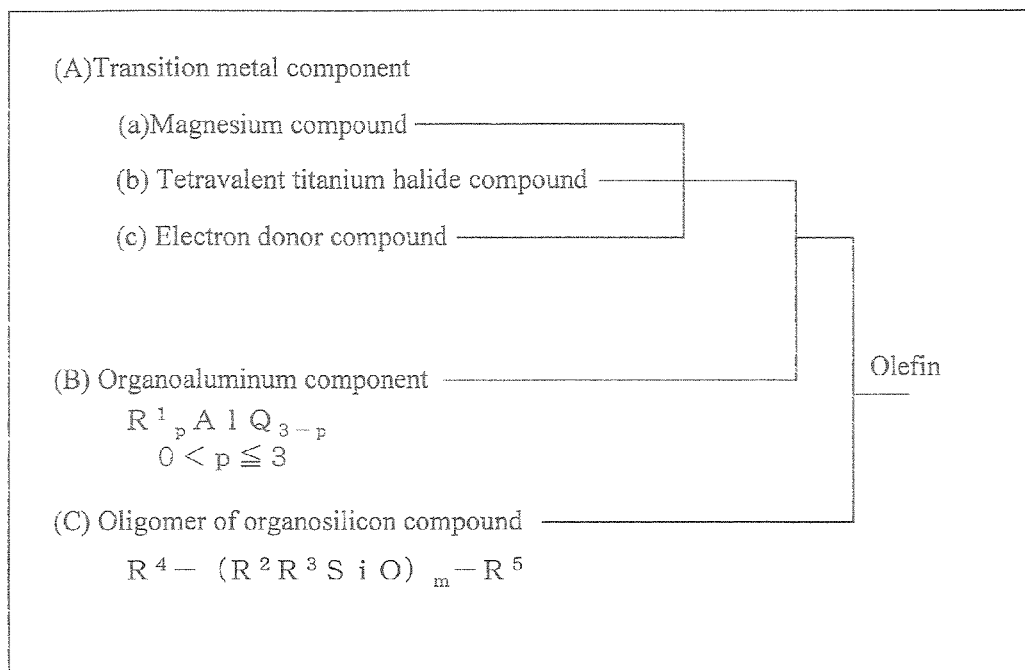
FIG. 1 is a flowchart showing a process for preparing the catalyst component and polymerization catalyst of the present invention.

For preparing the solid catalyst component (A) (hereinafter referred to from time to time as "component (A)") in the catalyst for olefin polymerization of the present invention, (a) a magnesium compound, (b) a tetravalent titanium halide compound, and (c) an electron donor compound are caused to come in contact with each other to form a solid product (solid product forming step). As the magnesium compound (hereinafter referred to from time to time as "component (a)") used in the solid product forming step, magnesium dihalide, dialkylmagnesium, alkylmagnesium halide, dialkoxymagnesium, diaryloxymagnesium, alkoxymagnesium halide, fatty-acid salt of magnesium, and the like can be given. Dialkoxymagnesium is preferable among these magnesium compounds. Specific examples include dimethoxymagnesium, diethoxymagnesium, dipropoxymagnesium, dibutoxymagnesium, ethoxymethoxymagnesium, ethoxypropoxymagnesium, and butoxyethoxymagnesium. Of these, diethoxymagnesium is particularly preferable. These dialkoxymagnesium compounds may be prepared by reacting metallic magnesium with an alcohol in the presence of a halogen, a halogen-containing metal compound, or the like. The above dialkoxymagnesium compounds may be used either individually or in combination of two or more.

The dialkoxymagnesium compound used for preparing the component (A) in the solid product forming step may be in the form of either granules or powder and either amorphous or spherical in the configuration. For example when spherical dialkoxymagnesium is used, the resulting polymer is in the form of a polymer powder having a more excellent particle form and a narrower particle size distribution. This improves operability of the polymer powder produced during polymerization operation and eliminates problems such as clogging caused by fine particles contained in the polymer powder.

The spherical dialkoxymagnesium need not necessarily be completely spherical but may be oval or potato-shaped. Specifically, the particles may have a ratio (1/w) of the major axis diameter (1) to the minor axis diameter (w) of 3 or less, preferably 1 to 2, and more preferably 1 to 1.5.

Dialkoxymagnesium with an average particle size from 1 to 200 μm can be used. A more preferable average particle size is 5 to 150 μm. In the case of spherical dialkoxymagnesium the average particle size is usually 1 to 100 μm preferably 5 to 50 μm, and more preferably 10 to 40 μm A powder having a narrow particle size distribution with a small fine and coarse powder content is preferably used. Specifically, the content of particles with a diameter of 5 μm or less should be 20% or less, and preferably 10% or less. On the other hand, the content of particles with a diameter of 100 μm or more should be 10% or less, and preferably 5% or less. Moreover, the particle size distribution represented by ln(D90/D10) wherein D90 is a particle size at 90% of the integrated particle sizes and D10 is a particle size at 10% of the integrated particle size, is 3 or less, and preferably 2 or less.

Methods of producing such spherical dialkoxymagnesium are described in, for example, JP-A 58-41832, JP-A 62-51633, JP-A 3-74341, JP-A 4-368391, and JP-A 8-73388.

The tetravalent titanium halide compound (b) (hereinafter referred to from time to time as "component (b)") used for the preparation of the component (A) in the present invention is one or more compounds selected from the group consisting of a titanium halide or alkoxytitanium halide represented by the formula $Ti(OR^8)_n X_{4-n}$, wherein $R^8$ represents an alkyl group having 1-4 carbon atoms, X represents a halogen atom, and n represents an integer satisfying the formula $0 \leq n \leq 4$.

Specific examples include, as titanium halides, titanium tetrahalides such as titanium tetrachloride, titanium tetrabromide, and titanium tetraiodide and, as alkoxytitanium halides, methoxytitanium trichloride, ethoxytitanium trichloride, propoxytitanium trichloride, n-butoxytitanium trichloride, dimethoxytitanium dichloride, diethoxytitanium dichloride, dipropoxytitanium dichloride, di-n-butoxytitanium dichloride, trimethoxytitanium chloride, triethoxytitanium chloride, tripropoxytitanium chloride, and tri-n-butoxytitanium chloride. Among these, titanium tetrahalides are preferable and a particularly preferable titanium tetrahalide is titanium tetrachloride. These titanium compounds may be used either individually or in combination of two or more.

The electron donor compound (hereinafter referred to from time to time as "component (c)") used for preparing the solid catalyst component (A) is an organic compound containing an oxygen atom or nitrogen atom Alcohols, phenols, ethers, esters, ketones, acid halides, aldehydes, amines, aides, nitrites, isocyanates, and organosilicon compounds containing an Si—O'C bond can be given as examples.

As specific examples, alcohols such as methanol, ethanol, n-propanol, and 2-ethylhexanol; phenols such as phenol and cresol; ethers such as methyl ether, ethyl ether, propyl ether, butyl ether, amyl ether, diphenyl ether, 9,9-bis(methoxymethyl)fluorene, and 2-isopropyl-2-isopentyl-1,3-dimethoxypropane; monocarboxylic acid esters such as methyl formate, ethyl acetate, vinyl acetate, propyl acetate, octyl acetate, cyclohexyl acetate, ethyl propionate, ethyl butylate, methyl benzoate, ethyl benzoate, propyl benzoate, butyl benzoate, octyl benzoate, cyclohexyl benzoate, phenyl benzoate, methyl p-toluate, ethyl p-toluate, methyl anisate, and ethyl anisate; dicarboxylic acid esters such as diethyl malonate, dipropyl malonate, dibutyl malonate, diisobutyl malonate, dipentyl malonate, dineopentyl malonate, diethyl isopropylbromomalonate, diethyl butylbromomalonate, diethyl isobutylbromomalonate, diethyl diisopropylmalonate, diethyl dibutylmalonate, diethyl diisobutylmalonate, diethyl diisopentylmalonate, diethyl isopropylisobutylmalonate, dimethyl isopropylisopentylmalonate, diethyl bis(3-chloro-n-propyl)malonate, diethyl bis(3-bromo-n-propyl)malonate, diethyl maleate, dibutyl maleate, dimethyl adipate, diethyl adipate, dipropyl adipate, dibutyl adipate, diisodecyl adipate, dioctyl adipate, phthalic acid diesters, and phthalic acid diester derivatives; ketones such as acetone, methyl ethyl ketone, butyl methyl ketone, acetophenone, and benzophenone; acid halides such as phthalic acid dichloride and terephthalic acid dichloride; aldehydes such as acetaldehyde, propionaldehyde, octylaldehyde, and benzaldehyde; amines such as methylamine, ethylamine, tributylamine, piperidine, aniline, and pyridine; amides such as oleic amide and stearic amide; nitriles such as acetonitrile, benzonitrile, and tolunitrile; isocyanates such as methyl isocyanate and ethyl isocyanate; and organosilicon compounds containing an Si—O—C bond such as phenylalkoxysilane, alkylalkoxysilane, phenylalkylalkoxysilane, cycloalkylalkoxysilane, and cycloalkylalkylalkoxysilane can be given.

Of these electron donors, esters, particularly diesters of an aromatic dicarboxylic acid are preferable, with phthalic acid diesters and phthalic acid diester derivatives being particularly preferable. Specific examples of the phthalic acid diester include the following compounds: dimethyl phthalate, diethyl phthalate, di-n-propyl phthalate, diisopropyl phthalate, di-n-butyl phthalate, diisobutyl phthalate, ethylmethyl phthalate, methyl(isopropyl) phthalate, ethyl(n-propyl) phthalate, ethyl(n-butyl) phthalate, ethyl(isobutyl) phthalate, di-n-pentyl phthalate, diisopentyl phthalate, dineopentyl phthalate, dihexyl phthalate, di-n-heptyl phthalate, di-n-octyl phthalate, bis(2,2-dimethylhexyl) phthalate, bis(2-ethylhexyl) phthalate, di-n-nonyl phthalate, diisodecyl phthalate, bis(2,2-dimethylheptyl) phthalate, n-butyl(isohexyl) phthalate, n-butyl(2-ethylhexyl) phthalate, n-pentylhexyl phthalate, n-pentyl(isohexyl) phthalate, isopentyl(heptyl) phthalate, n-pentyl(2-ethylhexyl) phthalate, n-pentyl(isononyl) phthalate, isopentyl(n-decyl) phthalate, n-pentylundecyl phthalate, isopentyl(isohexyl) phthalate, n-hexyl(2,2-dimethylhexyl) phthalate, n-hexyl(2-ethylhexyl) phthalate, n-hexyl(isononyl) phthalate, n-hexyl(n-decyl) phthalate, n-heptyl(2-ethylhexyl) phthalate, n-heptyl(isononyl) phthalate, n-heptyl(neodecyl) phthalate, and 2-ethylhexyl (isononyl) phthalate. One or more of these phthalic acid diesters can be used.

As the phthalic acid diester derivatives, compounds derived from the phthalic acid diesters by replacing one or two hydrogen atoms on the benzene ring, to which the two alkoxycarbonyl groups of the phthalic acid diester bond, with an alkyl group having 1-5 carbon atoms or a halogen atom such as a chlorine, bromine, or fluorine can be given. The solid catalyst component prepared by using these phthalic acid diester derivatives as the electron donor compound can increase the melt flow rate of the polymer due to the high activity or high response of the solid catalyst component to hydrogen even in the case of using a smaller or equivalent amount of hydrogen during the polymerization. As specific examples, dineopentyl 4-methylphthalate, dineopentyl 4-ethylphthalate, dineopentyl 4,5-dimethylphthalate, dineopentyl 4,5-diethylphthalate, diethyl 4-chlorophthalate, di-n-butyl 4-chlorophthalate, dineopentyl 4-chlorophthalate, diisobutyl 4-chlorophthalate, diisohexyl 4-chlorophthalate, diisooctyl 4-chlorophthalate, diethyl 4-bromophthalate, di-n-butyl 4-bromophthalate, dineopentyl 4-bromophthalate, diisobutyl 4-bromophthalate, diisohexyl 4-bromophthalate, diisooctyl 4-bromophthalate, diethyl 4,5-dichlorophthalate, di-n-butyl 4,5-dichlorophthalate, diisohexyl 4,5-dichlorophthalate, and diisooctyl 4,5-dichlorophthalate can be given. Among these, dineopentyl 4-bromophthalate, di-n-butyl 4-bromophthalate, and diisobutyl 4-bromophthalate are preferable.

A combined use of two or more of the above-mentioned esters is also preferable. In this instance, the total carbon atom numbers of alkyl groups of the ester used is preferably four or more greater than the total carbon atom numbers of alkyl groups of the other ester.

The component (A) of the present invention can be preferably prepared by causing the above components (a), (b), and (c) to come in contact with each other in the presence of an aromatic hydrocarbon compound (d) (hereinafter may be simply referred to as "component (d)"). Aromatic hydrocarbon compounds having a boiling point of 50° C. to 150° C. such as toluene, xylene, and ethylbenzene are preferably used as the component (d). The aromatic hydrocarbon compounds may be used either individually or in combination of two or more.

A particularly preferable method for preparing the solid product of the present invention comprises preparing a suspension of the component (a) in the aromatic hydrocarbon compound (d) having a boiling point of 50 to 150° C., causing the component (b) to come in contact with the suspension, causing the component (c) to come in contact with the resulting suspension, and reacting the mixture, In the solid product forming step in the method of preparing the solid catalyst component (A) of the present invention, in addition to the above components, a polysiloxane (hereinafter may be simply referred to as "component (e)") can be preferably used to improve the stereoregularity or crystallinity of the formed polymer and to reduce the amount of fine polymer powder. Polysiloxanes are polymers having a siloxane bond (—Si—O bond) in the main chain and are generally referred to as silicone oil. The polysiloxanes used in the present invention are chain-structured, partially hydrogenated cyclic, or modified polysiloxanes which are liquid or viscous at normal temperatures with a viscosity at 25° C. in the range of 0.02 to 100 cm$^2$/s (2 to 10,000 cSt), and preferably in the range of 0.03 to 5 cm$^2$/s (3 to 500 cSt).

As examples of the chain-structured polysiloxanes, dimethylpolysiloxane and methylphenylpolysiloxane can be given; as examples of the partially hydrogenated polysiloxanes, methyl hydrogen polysiloxanes with a hydrogenation degree of 10 to 80% can be given; as examples of the cyclic polysiloxanes, hexamethylcyclotrisiloxane, octamethylcyclotetrasiloxane, decamethylcyclopentasiloxane, 2,4,6-trimethylcyclotrisiloxane, and 2,4,6,8-tetramethylcyclotetrasiloxane can be given; as examples of the modified polysiloxane, higher fatty acid group-substituted dimethylsiloxane, epoxy group-substituted dimethylsiloxane, and polyoxyalkylene group-substituted dimethylsiloxane can be given. Of these, decamethylcyclopentasiloxane and dimethylpolysiloxane are preferable, with decamethylcyclopentasiloxane being particularly preferable.

The solid product can be prepared by causing the above components (a), (b), and (c), and, as required, the component (d) or component (e) to come in contact with each other. The method of preparing this solid product will now be described in detail. One specific example of the method for preparing the solid component comprises suspending the magnesium compound (a) in an alcohol, a halogenated hydrocarbon solvent, the tetravalent titanium halide (b) or the aromatic hydrocarbon compound (d), and causing the electron donor compound (c) such as a phthalic acid diester and/or the tetravalent titanium halide (b) to come in contact with the suspension. In this method, a spherical solid catalyst component with a sharp particle size distribution can be obtained by using a spherical magnesium compound Such a spherical solid product with a sharp particle size distribution can also be obtained without using a spherical magnesium compound if particles are formed by a spray dry method in which a solution or suspension is sprayed and dried using a sprayer, for example.

These components are caused to come in contact with each other in a vessel equipped with a stirrer in an inert gas atmosphere from which water and the like have been removed while stirring. The contact temperature, which is a temperature when these components are caused to come into contact with each other, may be either the same as or different from the reaction temperature. When the components are caused to come into contact with each other by stirring for preparing the mixture or are dispersed or suspended for a denaturing treatment, the components may be stirred at a comparatively low temperature of around room temperature. A temperature in a range from 40 to 130° C. is preferable for obtaining the product by reaction after contact. The reaction does not sufficiently proceed at a reaction temperature below 40° C., resulting in a solid component with inadequate properties. On the other hand, control of the reaction becomes difficult at a temperature above 130° C. due to vaporization of the solvent and the like. The reaction time is one minute or more, preferably 10 minutes or more, and still more preferably 30 minutes or more.

As preferable processes for preparing the solid product of the present invention, a process comprising suspending the component (a) in the component (d), causing the resulting suspension to come in contact with the component (b), then the component (c) and component (d), and causing these components to react and a process comprising suspending the component (a) in the component (d), causing the resulting suspension to come in contact with the component (c), then the component (b), and causing these components to react can be given. The solid product thus prepared may be caused to contact with the component (b) or the components (b) and (c) once more or two or more times to improve the performance of the ultimate solid catalyst component. This contacting step is preferably carried out in the presence of the aromatic hydrocarbons (d).

As a preferable method for preparing the solid product of the present invention, a method of preparing a suspension of the component (a), component (c), and an aromatic hydrocarbon compound (d) having a boiling point of 50 to 150° C., causing this suspension to contact with a mixed solution made from the component (b) and the component (d), and reacting the mixture.

As a preferable example of the method for preparing the solid product, the following methods can be given. A suspension is prepared from the above component (a), component (c), and an aromatic hydrocarbon compound (d) having a boiling point of 50 to 150° C. A mixed solution is prepared from the above component (b) and the aromatic hydrocarbon compound (d) having a boiling point of 50 to 150° C. The above-described suspension is added to this solution. The resulting mixture is heated and reacted (a first reaction) After the reaction, the solid product is washed with a hydrocarbon compound which is liquid at nor al temperatures to obtain a solid product. An additional component (b) and the aromatic hydrocarbon compound (d) having a boiling point of 50 to 150° C. are caused to come in contact with the washed solid product at a temperature of −20° C. to 100° C., then the temperature is raised to react the mixture (a second reaction). After the reaction, the reaction mixture is washed with a hydrocarbon compound which is liquid at normal temperatures 1 to 10 times to obtain a solid product.

Based on the above description, a particularly preferable process for preparing the solid catalyst component (A) comprises suspending the dialkoxymagnesium compound (a) in the aromatic hydrocarbon compound (d) having a boiling point in the range of 50 to 150° C., causing the tetravalent titanium halide (b) to contact the suspension, and reacting the mixture. In this instance, one or more electron donor compounds (c) such as phthalic acid diester are caused to come in contact with the suspension at a temperature from −20° C. to 130° C., either before or after the tetravalent titanium halide compound (b) is contacted, then optionally the component (e) is contacted and reacted, to obtain a solid product (1). In this instance, it is desirable to carry out an aging reaction at a low temperature either before or after the above one or more electron donor compounds (c) are caused to come in contact with the suspension. After washing the solid product (1) with a hydrocarbon compound which is liquid at normal temperatures (intermediate washing) the tetravalent titanium halide (b) is again caused to contact and react with the solid product (1) in the presence of the aromatic hydrocarbon compound at a temperature of −20° C. to 100° C. to obtain a solid reaction product (2). As required, the inter-mediate washing and the reaction may be further repeated several times. Next, the solid reaction product (2) is washed with a hydrocarbon compound which is liquid at normal temperatures by decantation to obtain the solid catalyst component (A).

The ratio of the components used for the preparation of the solid catalyst component (A) cannot be generically defined, because such a ratio varies according to the method of preparation employed. For example, the tetravalent titanium halide (b) is used in an amount of 0.5 to 100 mol, preferably 0.5 to 50 mol, still more preferably 1 to 10 mol; the electron donor compound (c) is used in an amount of 0.01 to 10 mol, preferably 0.01 to 1 mol, and still more preferably 0.02 to 0.6 mol; the aromatic hydrocarbon compound (d) is used in an amount of 0.001 to 500 mol, preferably 0.001 to 100 mol, and still more preferably 0.005 to 10 mol; and the polysiloxane (e) is used in an amount of 0.01 to 100 g, preferably 0.05 to 80 g, and still more preferably 1 to 50 g, for one mol of the magnesium compound (a).

Although there are no specific limitations to the amounts of titanium, magnesium, halogen atoms, and electron donors in the solid catalyst component (A), the content of titanium is 1.0 to 8.0 wt %, preferably 2.0 to 8.0 wt %, and still more preferably 3.0 to 8.0 wt %; the content of magnesium is 10 to 70 wt %, preferably 10 to 50 wt %, more preferably 15 to 40 wt %, and particularly preferably 15 to 25 wt %; the content of halogen atoms is 20 to 90 wt %, preferably 30 to 85 wt %, more preferably 40 to 80 wt %, and particularly preferably 45 to 75 wt %; and the total amount of electron donor compounds is 0.5 to 30 wt %, preferably 1 to 25 wt %, and particularly preferably 2 to 20 wt %

Any compounds represented by the above general formula (1) can be used without any specific limitation as the organoaluminum compound (B) (hereinafter referred to from time to time simply as "component (B)") for preparing the solid catalyst composition for the polymerization of olefins of the present invention. In the above general formula (1), $R^1$ is preferably an ethyl group or isobutyl group; Q is preferably a hydrogen atom, chlorine atom, or bromine atom; and p is preferably 2 or 3, and particularly preferably 3. As specific examples of such organoaluminum compounds (B), triethylaluminum, diethylaluminum chloride, triisobutylaluminum, diethylaluminum bromide, and diethylaluminum hydride can be given. These compounds may be used either individually or in combination of two or more. Of these, triethylaluminum and triisobutylaluminum are preferable.

The organosilicon compounds represented by the above chemical formula (1) can be used as the oligomer of an organosilicon compound (C) (hereinafter referred to from time to time simply as "component (C)") used for preparing the catalyst for polymerization of olefins in the present invention, In $R^2$ and $R^3$ in the above chemical formula (1), a methyl group, ethyl group, n-propyl group, isopropyl group, n-butyl group, isobutyl group, and t-butyl group are preferable as the alkyl group, a methoxy group, ethoxy group, n-propoxy group, and isopropoxy group are preferable as the alkoxy group, and chlorine atom is preferable as the halogen atom. As $R^4$ and $R^5$, a methyl group and ethyl group are preferable.

The component (C), which is an oligomer produced by condensation of an organosilicon compound, includes linear branched, or cyclic low molecular weight polysiloxanes with 2 to 20 monomer repetition (m: a degree of polymerization). As the organosilicon compound monomer used for producing the oligomer, tetraalkoxysilane, trialkoxysilane halide, dialkoxysilane halide, alkyltrialkoxysilane, and dialkyldialkoxysilane can be given. Of these, tetraalkoxysilane and trialkoxysilane halide are preferable. As specific examples of the monomers, tetramethoxysilane, tetraethoxysilane, tetra-n-propoxsilane, tetraisopropoxysilane, tetra-n-butoxysilane, tetraisobutoxysilane, tetra-t-butoxysilane, trimethylchlorosilane, triethylchlorosilane, tri-n-propoxychlorosilane, triisopropoxychlorosilane, tri-n-butoxychlorosilane, triisobutoxychlorosilane, tri-t-butoxychlorosilane, methyltrimethoxysilane, ethyltrimethoxysilane, n-propyltrimethoxysilane, isopropyltrimethoxysilane n-butyltrimethoxysilane, isobutyltrimethoxysilane, t-butyltrimethoxysilane, methyltriethoxysilane, ethyltriethoxysilane, n-propyltriethoxysilane, isopropyltriethoxysilane, n-butyltriethoxysilane, isobutyltriethoxysilane, t-butyltriethoxysilane, dimethyldimethoxysilane, diethyldimethoxysilane, di-n-propyldimethoxysilane, diisopropyldimethoxysilane, di-n-butyldimethoxysilane, diisobutyldimethoxysilane, di-t-butyldimethoxysilane, dimethyldiethoxysilane, diethyldiethoxysilane, di-n-propyldiethoxysilane, diisopropyldiethoxysilane, di-n-butyldiethoxysilane, diisobutyldiethoxysilane, and di-t-butyldiethoxysilane can be given. Of these, tetraethoxysilane, triethoxychlorosilane, diisopropyldimethoxysilane, and diisobutyldimethoxysilane are preferable.

Although an oligomer of an organosilicon compound in which the number of repetition (m) is uniform may be used as the component (C), a mixture of oligomers with different numbers of repetition, i.e. an oligomer with a molecular weight distribution, is preferably used. The use of an oligomer with a molecular weight distribution diversifies the component (C) acting on active points of the solid catalyst component (A) during the polymerization and, as a result, ensures production of olefin polymers with a broad molecular weight distribution. The component (C) is a mixture of oligomers of which the number of repetition (m) is preferably 2 to 10, and more preferably 2 to 8.

In the present invention, in addition to the oligomer of an organosilicon compound of the component (C), monomers of organosilicon compound from which the oligomer is produced are preferably used together, whereby not only can olefin polymers with a broader molecular weight distribution be produced, but also the catalyst activity to hydrogen can be promoted and crystallinity of the resulting olefin polymers is increased. Specifically, when an oligomer of tetraethoxysilane is used as the component (C), tetraethoxysilane is mixed in the component (C). Either one type of component (C) or a mixture of two or more types of component (C) may be used.

In the present invention, in addition to the above components (A), (B), and (C), an electron donor compound (D) (hereinafter referred to from time to time as "component (D)") may be used in combination. The component (D) is an organic compound containing an oxygen atom or nitrogen atom. Alcohols, phenols, ethers, esters, ketones, acid halides, aldehydes, amines, amides, nitriles, isocyanates, and organosilicon compounds containing an Si—O—C bond can be given as examples As specific examples, alcohols such as methanol, ethanol, n-propanol, 2-ethylhexanol; phenols such as phenol and cresol; ethers such as methyl ether, ethyl ether, propyl ether, butyl ether, amyl ether, diphenyl ether, 9,9-bis(methoxymethyl)fluorene, and 2-isopropyl-2-isopentyl-1,3-dimethoxypropane; monocarboxylic acid esters such as methyl formate, ethyl acetate, vinyl acetate, propyl acetate, octyl acetate, cyclohexyl acetate, ethyl propionate, ethyl butylate, methyl benzoate, ethyl benzoate, propyl benzoate, butyl benzoate, octyl benzoate, cyclohexyl benzoate, phenyl benzoate, ethyl p-methoxybenzoate, ethyl p-ethoxybenzoate, methyl p-toluate, ethyl p-toluate, methyl anisate, and ethyl anisate; dicarboxylic acid esters such as diethyl maleate, dibutyl maleate, dimethyl adipate, diethyl adipate, dipropyl adipate, dibutyl adipate, diisodecyl adipate, dioctyl adipate, dimethyl phthalate, diethyl phthalate, dipropyl phthalate, dibutyl phthalate, dipentyl phthalate, dihexyl phthalate, diheptyl phthalate, dioctyl phthalate, dinonyl phthalate, and didecyl phthalate; ketones such as acetone, methyl ethyl ketone, butyl methyl ketone, acetophenone, and benzophenone; acid halides such as phthalic acid dichloride and terephthalic acid dichloride; aldehydes such as acetaldehyde, propionaldehyde, octylaldehyde, and benzaldehyde; amines such as methylamine, ethylamine, tributylamine, piperidine, aniline, and pyridine, amides such as oleic amide and stearic amide; nitriles such as acetonitrile, benzonitrile, and tolunitrile; isocyanates such as methyl isocyanate and ethyl isocyanate; and the like can be given.

Among the above compounds, organosilicon compounds containing an Si—O—C bond other than the compounds shown by the above general formula (1), particularly compounds shown by the above general formula (2) are preferable.

As examples of such organosilicon compounds, phenylalkoxysilane, alkylalkoxysilane, phenylalkylalkoxysilane, cycloalkylalkoxysilane, and cycloalkylalkylalkoxysilane can be given.

The following compounds can be given as specific examples of such organosilicon compounds: trimethylmethoxysilane, trimethylethoxysilane, tri-n-propylmethoxysilane, tri-n-propylethoxysilane, tri-n-butylmethoxysilane, triisobutylmethoxysilane, tri-t-butylmethoxysilane, tri-n-butylethoxysilane, tricyclohexylmethoxysilane, tricyclohexylethoxysilane, cyclohexyldimethylmethoxysilane, cyclohexyldiethylmethoxysilane, cyclohexyldiethylethoxysilane, dimethyldimethoxysilane, dimethyldiethoxysilane, di-n-propyldimethoxysilane, diisopropyldimethoxysilane, di-n-propyldiethoxysilane, diisopropyldiethoxysilane, di-n-butyldimethoxysilane, diisobutyldimethoxysilane, di-t-butyldimethoxysilane, di-n-butyldiethoxysilane, n-butylmethyldimethoxysilane, bis(2-ethylhexyl)dimethoxysilane, bis(2-ethylhexyl)diethoxysilane, dicyclopentyldimethoxysilane, dicyclopentyldiethoxysilane, dicyclohexyldimethoxysilane, dicyclohexyldiethoxysilane, bis(3-methylcyclohexyl)dimethoxysilane, bis(4-methylcyclohexyl)dimethoxysilane, bis(3,5-dimethylcyclohexyl)dimethoxysilane, cyclohexylcyclopentyldimethoxysilane, cyclohexylcyclopentyldiethoxysilane, cyclohexylcyclopentyldipropoxysilane, 3-methylcyclohexylcyclopentyldimethoxysilane, 4-methylcyclohexylcyclopentyldimethoxysilane, 3,5-dimethylcyclohexylcyclopentyldimethoxysilane, 3-methylcyclohexylcyclohexyldimethoxysilane, 4-methylcyclohexylcyclohexyldimethoxysilane, 3,5-dimethylcyclohexylcyclohexyldimethoxysilane, cyclopentylmethyldimethoxysilane, cyclopentylmethyldiethoxysilane, cyclopentylethyldiethoxysilane, cyclopentyl(iso-propyl)dimethoxysilane, cyclopentyl(isobutyl)dimethoxysilane, cyclohexylmethyldimethoxysilane, cyclohexylmethyldiethoxysilane, cyclohexylethyldimethoxysilane, cyclohexylethyldiethoxysilane, cyclohexyl(n-propyl)dimethoxysilane, cyclohexyl(isopropyl)dimethoxysilane, cyclohexyl(n-propyl)diethoxysilane, cyclohexyl(isobutyl)dimethoxysilane, cyclohexyl(n-butyl)diethoxysilane, cyclohexyl(n-pentyl)dimethoxysilane, cyclohexyl(n-pentyl)diethoxysilane, diphenyldimethoxysilane, diphenyldiethoxysilane, phenylmethyldimethoxysilane, phenylmethyldiethoxysilane, phenylethyldimethoxysilane, phenylethyldiethoxysilane, methyltrimethoxysilane, methyltriethoxysilane, ethyltrimethoxysilane, ethyltriethoxysilane, n-propyltrimethoxysilane, isopropyltrimethoxysilane, n-propyltriethoxysilane, isopropyltriethoxysilane, n-butyltrimethoxysilane, isobutyltrimethoxysilane, t-butyltrimethoxysilane, n-butyltriethoxysilane, 2-ethylhexyltrimethoxysilane, 2-ethylhexyltriethoxysilane, cyclopentyltrimethoxysilane, cyclopentyltriethoxysilane, cyclohexyltrimethoxysilane, cyclohexyltriethoxysilane, vinyltrimethoxysilane, vinyltriethoxysilane, phenyltrimethoxysilane, phenyltriethoxysilane, tetramethoxysilane, tetraethoxysilane, tetrapropoxysilane, and tetrabutoxysilane.

Of these, preferable compounds are di-n-propyldimethoxysilane, diisopropyldimethoxysilane, di-n-butyldimethoxysilane, diisobutyldimethoxysilane, di-t-butyldimethoxysilane, di-n-butyldiethoxysilane, t-butyltrimethoxysilane, dicyclohexyldimethoxysilane, dicyclohexyldiethoxysilane, cyclohexylmethyldimethoxysilane, cyclohexylmethyldiethoxysilane, cyclohexylethyldimethoxysilane, cyclohexylethyldiethoxysilane, dicyclopentyldimethoxysilane, dicyclopentyldiethoxysilane, cyclopentyldimethoxysilane, cyclopentylmethyldimethoxysilane, cyclopentylmethyldiethoxysilane, cyclopentylethyldiethoxysilane, cyclohexylcyclopentyldimethoxysilane, cyclohexylcyclopentyldiethoxysilane, 3-methylcyclohexylcyclopentyldimethoxysilane, 4-methylcyclohexylcyclopentyldimethoxysilane, and 3,5-dimethylcyclohexylcyclopentyldimethoxysilane.

In addition to the above organosilicon compounds, aminosilane compounds such as bis(perhydroquinolino)dimethoxysilane and bis(perhydroisoquinolino)dimethoxysilane can be preferably used.

Either one type of these organosilicon compounds (D) or a combination of two or more types of these compounds can be used.

A preferable combination of the oligomer of an organosilicon compound (C) and the organosilicon compound (D) is a combination of the above-mentioned preferable oligomer of an organosilicon compound (C) and the above-mentioned preferable organosilicon compound (D), with combinations of an oligomer of tetraethoxysilane or an oligomer of triethoxychlorosilane (C) with an organosilicon compound (D) selected from dicyclohexyldimethoxysilane, dicyclopentyldimethoxysilane, cyclohexylcyclopentyldimethoxysilane, and cyclohexylmethyldimethoxysilane being particularly preferable.

Olefins are polymerized or copolymerized in the presence of a catalyst for olefin polymerization of the present invention As the olefins, ethylene, propylene, 1-butene, 1-pentene, 4-methyl-1-pentene, vinylcyclohexane, and the like can be used either individually or in combination of two or more. Of these, ethylene, propylene, and 1-butene can be suitably used with propylene being particularly preferable. Propylene can be copolymerized with other olefins. As the olefins to be copolymerized, ethylene, 1-butene 1-pentene, 4-methyl-1-pentene, vinyl cyclohexane, and the like can be used either individually or in combination of two or more. Of these, ethylene and 1-butene can be suitably used. As the method for copolymerizing propylene with other olefins, random copolymerization of polymerizing propylene with a small amount of ethylene in one step and propylene-ethylene block copolymerization of polymerizing only propylene in a first step (first polymerization vessel) and copolymerizing propylene and ethylene in a second step (second polymerization vessel) are typical methods. The catalyst of the present invention comprising the component (A), component (B), and component (C) and, optionally, component (D) is effective in both the random copolymerization and block copolymerization for improving the catalytic activity, stereoregularity, catalyst activity to hydrogen, copolymerization performance, and properties of resulting copolymers.

The ratio of each component used is not specifically limited inasmuch as such a ratio does not influence the effect of the present invention. Usually, the component (B) is used in an amount of 1 to 2000 mol, and preferably 50 to 1000 mol, per one mol of titanium atom in the component (A). Each of the component (C) and the component (D) is used in an amount of 0.002 to 10 mole preferably 0.01 to 2 mol, and particularly preferably 0.01 to 0.5 mol, per one mol of the component (B). The component (C) and component (D) are used at a molar ratio of 1:99 to 60:40, preferably 5:95 to 50:50, and particularly preferably 10:90 to 40:60.

Although the order of contact of the components is not limited, it is desirable to first add the component (B) to the polymerization system and then cause the component (C) to come in contact with the component (B). Then, it is desirable that the component (A) is further contacted. A method of forming a catalyst by adding the component (B) to the polymerization system, separately causing the component (A) to contact the component(C), and feeding the contacted component (A) and component (C), and component (D) to the polymerization system is also a preferable embodiment. It is possible to further improve the catalyst activity to hydrogen and crystalline properties of the resulting polymer by using a previously contacted mixture of the component (A) and component (C) in this manner.

In the present invention, polymerization can be carried out either in the presence or in the absence of an organic solvent. Olefin monomers such as propylene may be used either in a gaseous state or in a liquid state. The polymerization reaction is carried out at a temperature of 200° C. or less, and preferably at 100° C. or less, under a pressure of 10 MPa or less, and preferably 5 MPa or less. Either a continuous polymerization system or a batch polymerization system may be used for the polymerization reaction. In addition, the polymerization can be completed either in one step or in two or more steps.

In polymerizing olefins using the catalyst formed from the component (A), component (B), and component (C) (hereinafter may be referred to from time to time as "main polymerization"), it is desirable to preliminarily polymerize the olefins prior to the main polymerization to further improve the catalyst activity, stereoregularity, properties of resulting polymer particles, and the like. In the case of preliminarily polymerization, monomers such as the same olefins used for the main polymerization or styrene can be used. Specifically, after causing the component (A) to contact the component (B) and the component (C) in the presence of olefins to preliminarily polymerize to produce 0.1 to 100 g of the polyolefins for 1 g of the component (A), the component (B) and the component (C) are further caused to contact to form the catalyst.

Although the order of contact of the components and monomers in carrying out the preliminary polymerization is optional it is desirable to first add the component (B) to the preliminary polymerization system in an inert gas or olefin gas atmosphere such as propylene, cause the component (A) to come in contact with the component (B), and then cause an olefin such as propylene and/or one or more other olefins to come in contact with the mixture.

It has been confirmed that polymerization of olefins in the presence of the olefin polymerization catalyst of the present invention can produce olefin polymers with a broad molecular weight distribution in a high yield, while maintaining high stereoregularity of polymers, as compared with the case of polymerization using a conventional catalyst.

The present invention will be described in more detail by examples, which should not be construed as limiting the present invention.

EXAMPLE 1

(Preparation of Solid Catalyst Component)

A 500 ml round bottom flask equipped with a stirrer, of which the internal atmosphere had been sufficiently replaced by nitrogen gas, was charged with 20 g of diethoxymagnesium and 160 ml of toluene to prepare a suspension. Then, 40 ml of titanium tetrachloride was added to the suspension. Next, after heating the suspension to 90° C., 5.4 ml of di-n-butyl phthalate was added and the mixture was further heated to 110° C. and reacted for 1.5 hours with stirring. After the reaction, the resulting reaction mixture was washed three times with 180 ml of toluene at 90° C. After the addition of 140 ml of toluene and 40 ml of titanium tetrachloride, the reaction mixture was heated to 100° C. and reacted for two hours with stirring. The reaction product was washed eight times with 200 ml of heptane at 40° C., filtered, and dried to obtain a solid catalyst component (A) in the form of a powder. The content of titanium in this solid catalyst component was 2.9 wt %

(Preparation of Polymerization Catalyst and Polymerization)

A 2.0 l autoclave equipped with a stirrer, of which the internal atmosphere had been entirely replaced by nitrogen gas, was charged with 1.32 mmol of triethylaluminum, an oligomer of tetraethoxysilane (polymerization degree: 2 to 7) in an amount of 0.13 mmol (as silicon atom), and the above solid catalyst component in an amount, in terms of the titanium atom contained therein, of 0.0026 mmol, thereby forming a polymerization catalyst. Then, with the addition of 0.5 l of hydrogen gas and 1.4 l of liquefied propylene, preliminary polymerization was carried out for five minutes at 20° C., following which the mixture was heated and main polymerization was carried out for one hour at 70° C. The polymerization activity, the heptane insoluble matters (HI), the melt index (MI), and the molecular weight distribution of the resulting polymer were measured. The results are also shown in Table 1.

The polymerization activity per gram of the solid catalyst component was calculated by the following formula:

Polymerization activity=Produced polymer $(F)(g)/$ Solid catalyst component $(g)$ The polymer (G) insoluble in n-heptane determined by extracting the above polymer for six hours in boiling n-heptane was measured to determine the proportion of components insoluble in boiling n-heptane (HI) in this polymer according to the following formula:

$HI=(G)(g)/(F)(g)$

The melt index (MI) of the polymer was determined according to the test method conforming to ASTM D1238 or JIS K7210.

The molecular weight distribution of polymers was evaluated by the ratio (Mw/Mn) of the weight average molecular weight (Mw) to the number average molecular weight (Mn) and the ratio (Mz/Mw) of the Z-average molecular weight (Mz) to the weight average molecular weight (Mw), measured by cross fractionation chromatography CFC) using CFC T-150B (manufactured by Mitsubishi Chemical Corp.) under the following conditions.

Solvent: o-dichlorobenzene (ODCB)
Temperature: 140° C. (SEC)
Column: Shodex GPC UT-806M
Sample concentration: 4 g/l-ODCB (200 mg/50 ml-ODCB)
Charge amount: 0.5 ml
Flow rate: 1.0 ml/min
Temperature range: 0 to 140° C.

EXAMPLE 2

The same experiment as in Example 1 was carried out, except for using an oligomer of triethoxychlorosilane (polymerization degree: 2 to 8) in an amount of 0.13 mmol (as silicon atom) instead of the oligomer of tetraethoxysilane. The results are shown in Table 1.

EXAMPLE 3

The same experiment as in Example 1 was carried out, except for using an oligomer of tetraethoxysilane polymerization degree: 3) in an amount of 0.13 mmol (as silicon atom) instead of the oligomer of tetraethoxysilane (polymerization degree: 2 to 7) in an amount of 0.13 mmol (as silicon atom) and changing the amount of hydrogen gas to 0.41. The results are shown in Table 1.

EXAMPLE 4

The same experiment as in Example 1 was carried out, except for using an oligomer of tetraethoxysilane (polymerization degree: 5) in an amount of 0.13 mmol (as silicon atom) instead of the oligomer of tetraethoxysilane (polymerization degree: 2 to 7) in an amount of 0.13 mmol (as silicon atom) and changing the amount of hydrogen gas to 0.41. The results are shown in Table 1.

EXAMPLE 5

The same experiment as in Example 1 was carried out, except for using an oligomer of tetraethoxysilane (polymerization degree: 2 to 7) in an amount of 0.026 mmol (as silicon atom) and 0.104 mmol of cyclohexylmethyldimethoxysilane instead of the oligomer of tetraethoxysilane (polymerization degree: 2 to 7) in an amount o 0.13 mmol (as silicon atom) and using hydrogen gas in an amount of 1.01 instead of 0.51 . The results are shown in Table 1.

EXAMPLE 6

The same experiment as in Example 1 was carried out, except for using an oligomer of tetraethoxysilane (polymerization degree: 2 to 7) in an amount of 0.026 mmol (as silicon atom) and 0.104 mmol of dicyclopentyldimethoxysilane instead of the oligomer of tetraethoxysilane (polymerization degree: 2 to 7) in an amount of 0.13 mmol (as silicon atom) and using hydrogen gas in an amount of 1.01 instead of 0.51. The results are shown in Table 1.

EXAMPLE 7

The same experiment as in Example 1 was carried out, except for using an oligomer of tetraethoxysilane (polymerization degree: 2 to 7) in an amount of 0.026 mmol (as silicon atom) and 0.104 mmol of cyclohexylcyclopentyldimethoxysilane instead of the oligomer of tetraethoxysilane (polymerization degree: 2 to 7) in an amount of 0.13 mmol (as silicon atom) and using hydrogen gas in an amount of 1.01 instead of 0.51. The results are shown in Table 1.

EXAMPLE 8

(Preparation of Solid Catalyst Component)

A 500 ml round bottom flask equipped with a stirrer, of which the internal atmosphere had been sufficiently replaced by nitrogen gas, was charged with 4.76 g of anhydrous magnesium chloride, 25 ml of decane, and 23.4 ml of 2-ethylhexyl alcohol. The mixture was reacted for two hours at 130° C. to obtain a homogeneous solution. Then, 1.11 g of phthalic anhydride was added to the homogeneous solution and the mixture was reacted at 130° C. for one hour. The resulting reaction solution was added dropwise over one hour to 200 ml of titanium tetrachloride maintained at −20° C. in another 500 ml round bottom flask equipped with a stirrer, of which the internal atmosphere had been sufficiently replaced by nitrogen gas. The mixed solution was heated to 110° C. over four hours and 2.68 ml of diisobutyl phthalate was added. The mixture was reacted for two hours. After the reaction the liquid portion was removed by filtration. The remaining solid was washed with decane and hexane at 110° C. until no free titanium compounds were detected, filtered, and dried to obtain a solid catalyst component in the form of a powder. The content of titanium in the solid catalyst component was measured and found to be 3.1 wt %.

(Preparation of Polymerization Catalyst and Polymerization)

A polymerization catalyst was prepared and polymerization was carried out in the same manner as in Example 1, except for using the solid catalyst component prepared above. The results are shown in Table 1.

EXAMPLE 9

(Preparation of Solid Catalyst Component)

A 1,000 ml round bottom flask equipped with a stirrer, of which the internal atmosphere had been sufficiently replaced by nitrogen gas, was charged with 32 g of magnesium flake used as a Grignard agent. A mixture of 120 g of butyl chloride and 500 ml of dibutyl ether was added dropwise to the magnesium over four hours at 50° C., then the mixture was reacted for one hour at 60° C. After the reaction, the reaction solution was cooled to room temperature and the solid components were removed by filtration to obtain a solution of the magnesium compound. 150 ml of the magnesium compound solution was added dropwise over four hours at 5° C. to a homogeneous solution which was prepared from 240 ml of hexane, 5.4 g of tetrabutoxytitanium, and 61.4 g of tetraethoxysilane in a 500 ml round bottom flask equipped with a stirrer, of which the internal atmosphere had been sufficiently replaced by nitrogen gas. After the reaction, the mixture was stirred for one hour at room temperature. The resulting reaction solution was filtered at room temperature to remove the liquid portion. The resulting solid was washed eight times with 240 ml of hexane, and dried under reduced pressure to obtain a solid product. 8.6 g of the solid product was added to a 100 ml round bottom flask equipped with a stirrer, of which the internal atmosphere had been sufficiently replaced by nitrogen gas, followed by the addition of 48 ml of toluene and 5.8 ml of diisobutyl phthalate. The mixture was reacted for one hour at 95° C. Next, the liquid portion was removed by filtration and the solid residue was washed eight times with 85 ml of toluene. After washing, 21 ml of toluene, 0.48 ml of diisobutyl phthalate, and 12.8 ml of titanium tetrachloride were added to the flask. Then, the mixture was reacted at 95° C. for eight hours. After the reaction, the solid was separated from the liquid at 95° C., washed twice with 48 ml of toluene, and again treated with diisobutyl phthalate and titanium tetrachloride under the same conditions as above. The resulting solid was washed eight times with 48 ml of hexane, filtered, and dried to obtain a solid catalyst component in the form of a powder. The content of titanium in the solid catalyst component was measured and found to be 2.1 wt %.

(Preparation of Polymerization Catalyst and Polymerization)

A polymerization catalyst was prepared and polymerization was carried out in the same manner as in Example 1, except for using the solid catalyst component prepared above. The results are shown in Table 1.

COMPARATIVE EXAMPLE 1

The same experiment as in Example 1 was carried out, except for using 0.13 mmol of cyclohexylmethyldimethoxysilane instead of 0.13 mmol (as silicon atom) of the oligomer of tetraethoxysilane (polymerization degree: 2 to 7) and using hydrogen gas in an amount of 2.01 instead of 0.51. The results are shown in Table 1.

COMPARATIVE EXAMPLE 2

The same experiment as in Example 1 was carried out, except for using 0.13 mmol of dicyclopentyldimethoxysilane instead of 0.13 mmol (as silicon atom) of the oligomer of tetraethoxysilane (polymerization degree: 2 to 7) and using hydrogen gas in an amount of 2.0 l instead of 0.5 l. The results are shown in Table 1.

COMPARATIVE EXAMPLE 3

The same experiment as in Example 1 was carried out, except for using 0.13 mmol of tetraethoxysilane instead of 0.13 mmol (as silicon atom) of the oligomer of tetraethoxysilane (polymerization degree: 2 to 7) and using hydrogen gas in an amount of 2.0 l instead of 0.5 l. The results are shown in Table 1.

COMPARATIVE EXAMPLE 4

The same experiment as in Example 1 was carried out, except for using 0.13 mmol of cyclohexylcyclopentyldimethoxysilane instead of 0.13 mmol (as silicon atom) of the oligomer of tetraethoxysilane (polymerization degree: 2 to 7) and using hydrogen gas in an amount of 2.0 l instead of 0.5 l. The results are shown in Table 1.

COMPARATIVE EXAMPLE 5

The same experiment as in Example 5 was carried out, except for using 0.026 mmol of tetraethoxysilane instead of 0.13 mmol (as silicon atom) of the oligomer of tetraethoxysilane (polymerization degree: 2 to 7). The results are shown in Table 1.

COMPARATIVE EXAMPLE 6

The same experiment as in Example 6 was carried out, except for using 0.026 mmol of tetraethoxysilane instead of 0.13 mmol (as silicon atom) of the oligomer of tetraethoxysilane (polymerization degree: 2 to 7). The results are shown in Table 1.

COMPARATIVE EXAMPLE 7

The same experiment as in Example 7 was carried out, except for using 0.026 mmol of tetraethoxysilane instead of 0.13 mmol (as silicon atom) of the oligomer of tetraethoxysilane (polymerization degree: 2 to 7). The results are shown in Table 1.

TABLE 1

| Example No. | Polymerization activity (g-PP/g-cat.) | HI (wt %) | MI (g/10 min) | Mw/Mn | Mz/Mw |
|---|---|---|---|---|---|
| Example 1 | 33100 | 98.3 | 4.0 | 11.8 | 11.0 |
| Example 2 | 35600 | 97.9 | 6.4 | 11.0 | 10.8 |
| Example 3 | 23000 | 97.9 | 3.4 | 11.7 | 9.2 |
| Example 4 | 28600 | 98.1 | 3.1 | 10.4 | 10.1 |
| Example 5 | 53600 | 98.5 | 6.8 | 10.8 | 10.4 |
| Example 6 | 70300 | 98.7 | 5.5 | 10.5 | 9.8 |
| Example 7 | 59400 | 98.5 | 6.0 | 13.5 | 11.3 |
| Example 8 | 30500 | 98.1 | 3.9 | 11.5 | 10.5 |
| Example 9 | 31800 | 98.0 | 4.2 | 11.2 | 10.8 |
| Comparative Example 1 | 55700 | 98.6 | 6.0 | 8.0 | 6.1 |
| Comparative Example 2 | 63500 | 98.5 | 4.5 | 6.5 | 8.4 |
| Comparative Example 3 | 24000 | 98.6 | 6.0 | 9.2 | 8.9 |
| Comparative Example 4 | 56300 | 98.6 | 4.8 | 10.5 | 6.9 |
| Comparative Example 5 | 51500 | 98.3 | 4.5 | 8.5 | 8.0 |
| Comparative Example 6 | 64200 | 98.5 | 4.5 | 8.0 | 7.5 |
| Comparative Example 7 | 54600 | 98.1 | 5.4 | 9.5 | 8.9 |

It can be seen from the above results that olefin polymers with a broad molecular weight distribution can be obtained in a high yield while maintaining high stereoregularity of the polymers by using the catalyst of the present invention. In addition, it can be seen that if the oligomer of organosilicon compound (C) and the organosilicon compound (D) are used in combination, not only can olefin polymers with a broad molecular weight distribution be obtained in a high yield, but also polymers with a high MI can be obtained using smaller amount of hydrogen during polymerization, i.e. the catalyst activity to hydrogen is improved.

INDUSTRIAL APPLICABILITY

The catalyst for polymerization of olefins of the present invention can produce olefin polymers having higher stereoregularity and a broader molecular weight distribution in a higher yield than conventional catalysts. The catalyst is thus expected not only to produce polyolefins for common use at a low cost, but also to be useful in the manufacture of olefin polymers having high functions.

The invention claimed is:

1. A catalyst for olefin polymerization comprising:
 (A) a solid catalyst component prepared by causing (a) a magnesium compound, (b) a tetravalent titanium halide compound, and (c) an electron donor compound to come in contact with each other,
 (B) an organoaluminum compound of the following general formula (1), $$R^1_p AlQ_{3-p} \qquad (1)$$

wherein $R^1$ represents an alkyl group having 1-4 carbon atoms, Q represents a hydrogen atom or a halogen atom, and p represents a real number satisfying the formula $0<p\leq 3$, and
 (C) an oligomer of tetraethoxysilane or an oligomer of triethoxychlorosilane.

2. The catalyst for olefin polymerization according to claim 1, wherein the component (C) is an oligomer of tetraethoxysilane.

3. The catalyst for olefin polymerization according to claim 1, wherein the component (C) is an oligomer having a degree of polymerization of 2-20.

4. The catalyst for olefin polymerization as claimed in claim 1, further comprising:
 (D) an organosilicon compound of the following general formula (2), $$R^6_q Si(OR^7)_{4-q} \qquad (2)$$

wherein $R^6$ individually represents an alkyl group having 1 to 12 carbon atoms, cycloalkyl group, phenyl group, vinyl group, allyl group, or aralkyl group, $R^7$ individually represents an alkyl group having 1 to 4 carbon atoms, cycloalkyl group, phenyl group, vinyl group, allyl group, or aralkyl group, and q indicates an integer from 0 to 3.

5. The catalyst for olefin polymerization according to claim 4, wherein the component (C) is an oligomer of tetraethoxysilane and the component (D) is dicyclohexyldimethoxysilane.

6. The catalyst for olefin polymerization according to claim 4, wherein the component (C) is an oligomer of tetraethoxysilane and the component (D) is dicyclopentyldimethoxysilane.

7. The catalyst for olefin polymerization according to claim 4, wherein the component (C) is an oligomer of tetraethoxysilane and the component (D) is cyclohexylcyclopentyldimethoxysilane.

8. The catalyst for olefin polymerization according to claim 4, wherein the component (C) is an oligomer of tetraethoxysilane and the component (D) is cyclohexylmethyldimethoxysilane.

9. A process, comprising polymerizing or copolymerizing an olefin monomer in the presence of the catalyst for olefin polymerization of claim 1.

10. The process according to claim 9, wherein the olefin monomer is propylene.

11. The catalyst for olefin polymerization according to claim 1, wherein the component (C) is an oligomer of triethoxychlorosilane.

12. The catalyst for olefin polymerization according to claim 4, wherein the component (C) is an oligomer of tetraethoxysilane.

13. The catalyst for olefin polymerization according to claim 4, wherein the component (C) is an oligomer of triethoxychlorosilane.

14. A process, comprising polymerizing or copolymerizing an olefin monomer in the presence of the catalyst for olefin polymerization of claim 4.

15. The process according to claim 14, wherein the olefin monomer is propylene.

* * * * *